(12) United States Patent
Schroeder

(10) Patent No.: US 8,118,261 B1
(45) Date of Patent: Feb. 21, 2012

(54) DROGUE DEPLOYING/RETRIEVAL METHOD

(75) Inventor: Steven Bernard Schroeder, Derby, KS (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/286,207

(22) Filed: Oct. 31, 2011

Related U.S. Application Data

(62) Division of application No. 11/938,636, filed on Nov. 12, 2007, now Pat. No. 8,074,931.

(51) Int. Cl.
*B64D 39/00* (2006.01)
(52) U.S. Cl. .................................. 244/135 A; 244/1 TD
(58) Field of Classification Search .............. 244/135 R, 244/135 A, 136, 1 TD
See application file for complete search history.

(56) References Cited

U.S. PATENT DOCUMENTS

| | | | | |
|---|---|---|---|---|
| 2,388,013 A * | 10/1945 | Rasor | ................................. | 244/3 |
| 2,852,216 A * | 9/1958 | Peters | ....................... | 244/135 A |
| 2,879,017 A * | 3/1959 | Smith | ....................... | 244/135 A |
| 2,949,265 A * | 8/1960 | Person | ....................... | 244/135 A |
| 2,973,171 A * | 2/1961 | Ward et al. | ................ | 244/135 A |
| 2,995,321 A * | 8/1961 | Zeitler | ....................... | 244/135 A |
| 3,439,700 A * | 4/1969 | Preston | ....................... | 137/351 |
| 3,747,873 A * | 7/1973 | Layer et al. | ....................... | 244/3 |
| 4,304,189 A * | 12/1981 | Wright | ....................... | 114/254 |
| 5,573,206 A * | 11/1996 | Ward | ....................... | 244/135 A |
| 6,604,711 B1 * | 8/2003 | Stevens et al. | ............ | 244/135 A |

* cited by examiner

*Primary Examiner* — Tien Dinh
*Assistant Examiner* — Philip J Bonzell

(57) ABSTRACT

An in-flight refueling method may include deploying a fueling hose from a refueling aircraft. The fueling hose may have a drogue. The deployment of the fueling hose may include extending the drogue using a telescoping arm having a ring. The deployment of the fueling hose may also include passing the fueling hose through the ring to deploy the fueling hose. The in-flight refueling method may further include retrieving the fueling hose by drawing the drogue into a wire pitch mounted on the ring and collapsing the drogue in response to drawing the drogue into the wire pitch.

20 Claims, 9 Drawing Sheets

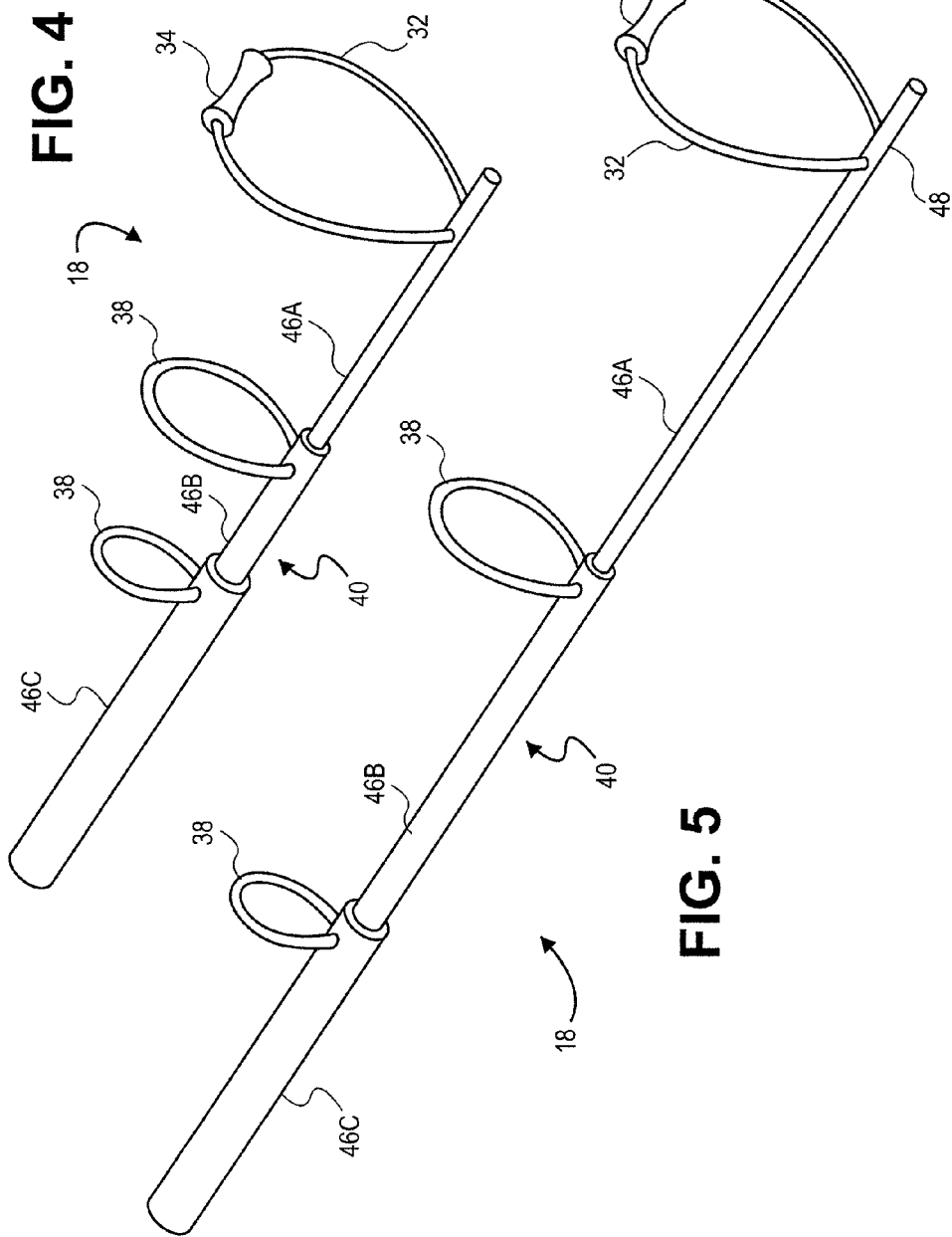

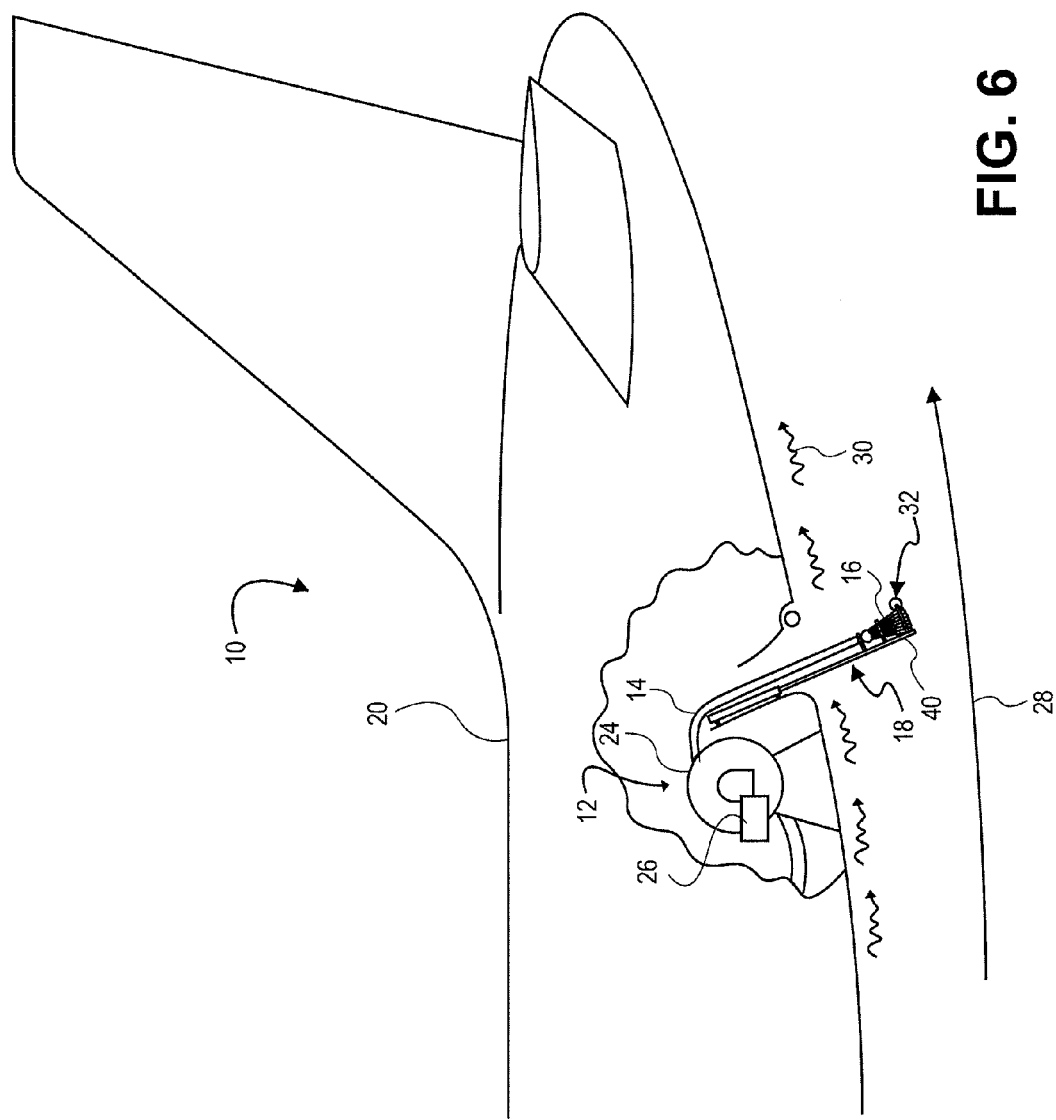

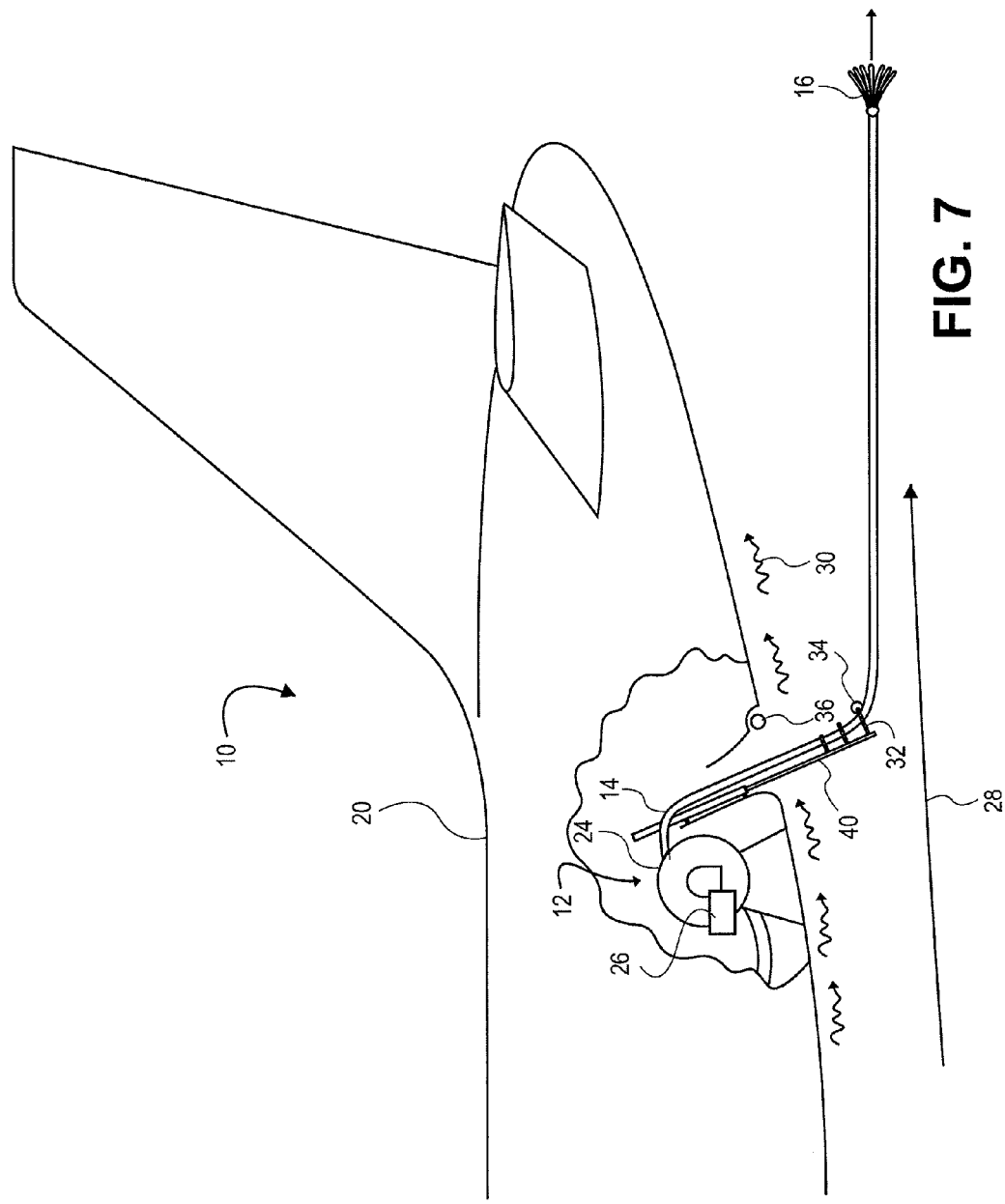

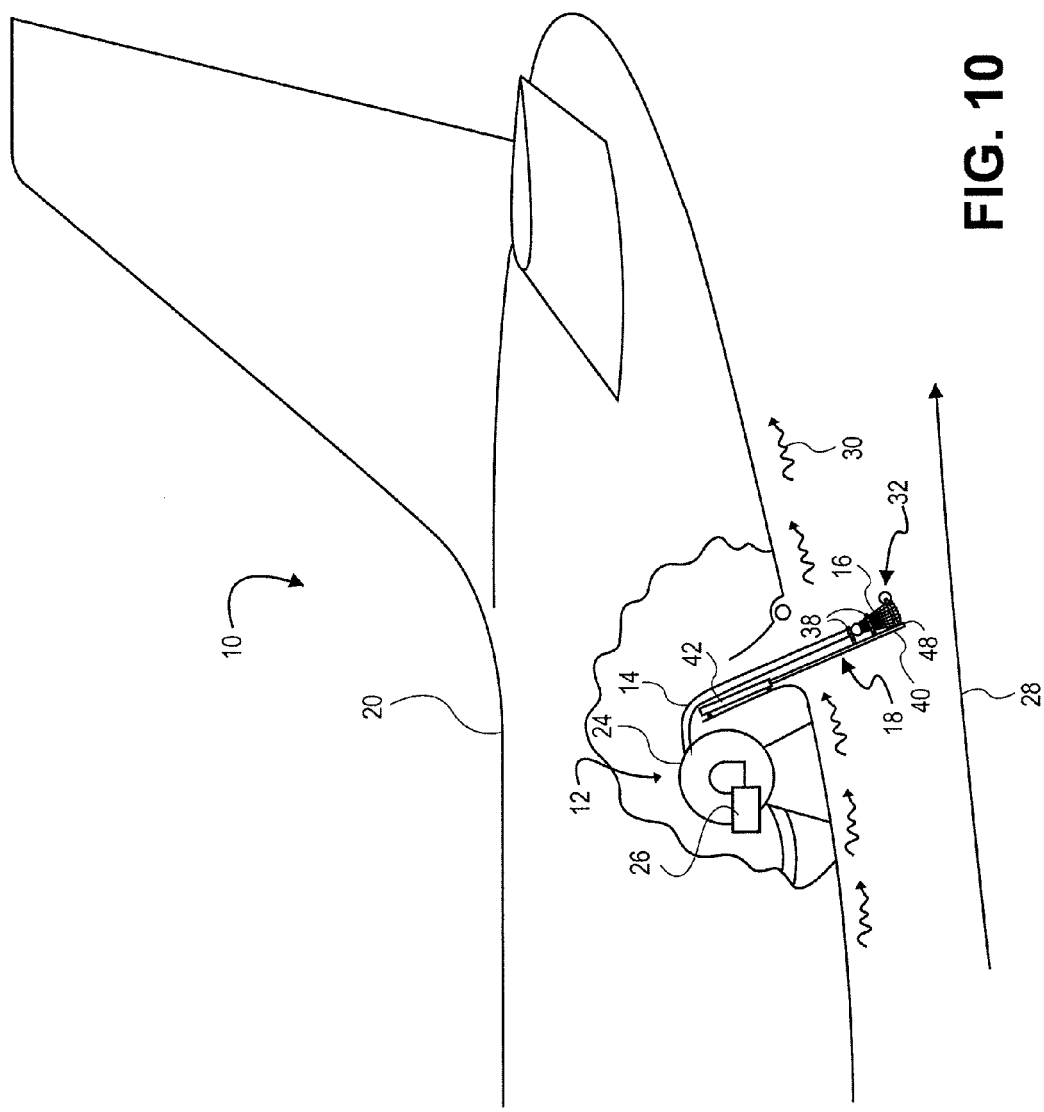

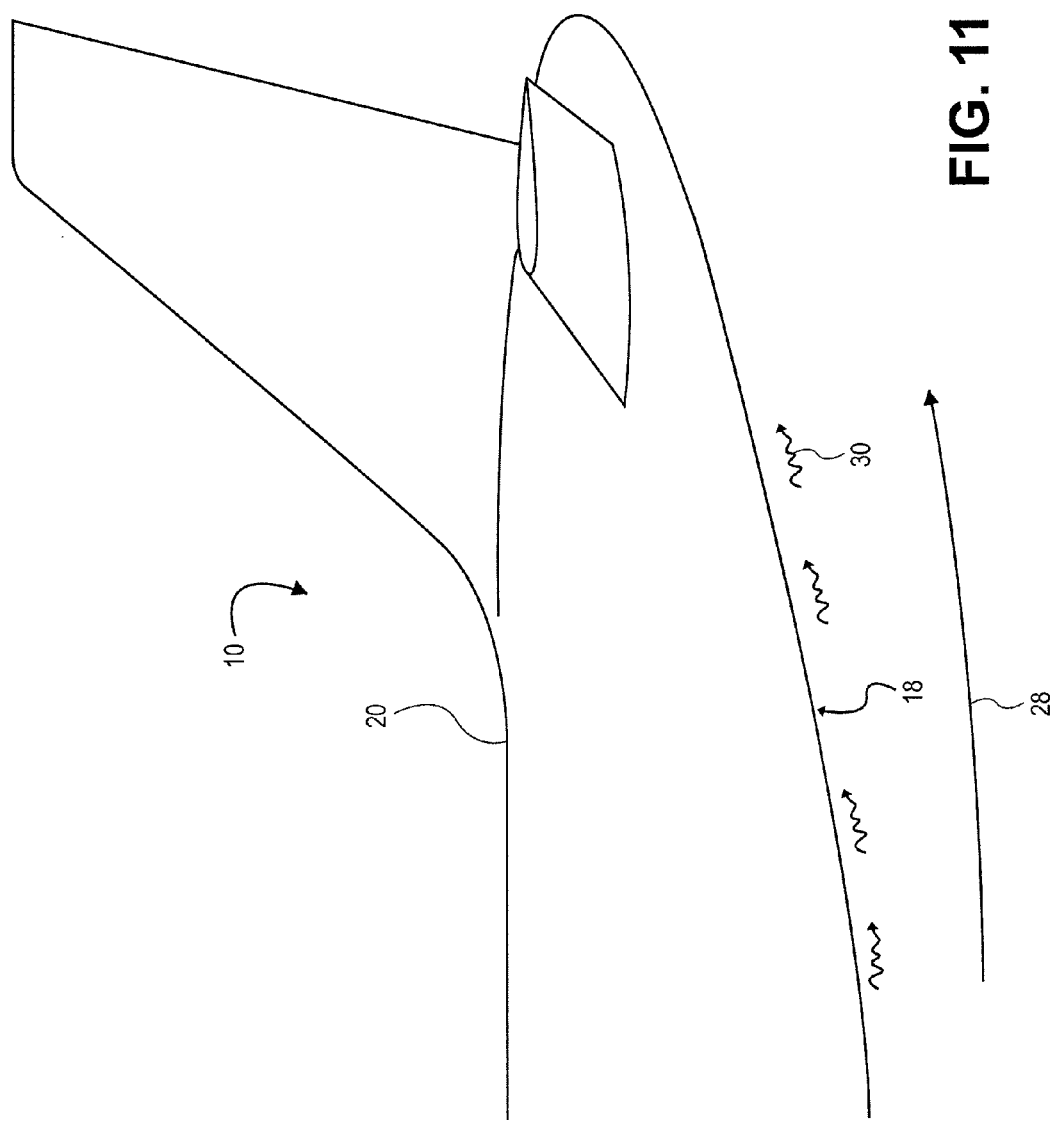

DROGUE DEPLOYING/RETRIEVAL METHOD

CROSS-REFERENCE TO RELATED APPLICATIONS

This application is a divisional application of and claims priority to pending U.S. application Ser. No. 11/938,636 filed on Nov. 12, 2007 and entitled DROGUE DEPLOYING/RETRIEVAL DEVICE, SYSTEM, AND METHOD, the entire contents of which is expressly incorporated by reference herein.

FIELD

The present disclosure generally relates to deploying/retrieval of items from an aircraft. More particularly, the present disclosure pertains to a device and system for deploying/retrieval a drogue from an aircraft.

BACKGROUND

Aerial refueling is presently utilized to extend the flight time and/or range of aircraft. In general, to aerially refuel an aircraft, a tanker aircraft deploys a boom or hose fitted with a coupling that is configured to mate with a receptacle on the receiving aircraft. In boom outfitted tankers, the boom is equipped with a male nozzle and the boom is typically controlled by a boom operator that guides the nozzle into a female fitting on the receiving aircraft. In hose outfitted tankers, the hose is equipped with a female coupling and a drogue. When placed in an air stream, the drogue acts to draw the hose out of the aircraft and stabilize the flight of the hose when extended. These two systems are generally not interchangeable.

Boom equipped tanker systems are relatively more complicated than drogue systems. In addition to the increased bulk and expense of the boom equipment, a boom operator is typically required. When the boom systems were initially introduces, boom systems could deliver greater flow rates of fuel. However, with advances in drogue systems, flow rates are generally comparable between boom and drogue systems.

A disadvantage of drogue systems is that during deployment and retrieval, the drogue passes though a boundary layer air. This boundary layer of air is in close proximity to the skin of the aircraft The flow of the boundary layer of air is retarded via interaction with the aircraft skin. As the drogue passes through the boundary layer, the drogue is subjected to wind shear. In addition, the drogue causes turbulence as it is introduced to airflow. These forces tend to cause the drogue, along with the hose and nozzle, to oscillate in an undesirable manner.

Accordingly, it is desirable to provide a drogue device and system that is capable of overcoming the disadvantages described herein at least to some extent.

SUMMARY

The foregoing needs are met, to a great extent, by embodiments of the present disclosure, wherein in one respect a drogue device and system is provided that in some embodiments decreases the effects of wind shear between the drogue and the aircraft.

An embodiment relates to an in-flight refueling device. The in-flight refueling device includes an arm, ring and actuator. The arm has a proximate end and a distal end. The ring is secured to the distal end and is configured to releasably secure a drogue. The actuator is secured to the proximate end and is configured to extend the arm a predetermined distance.

Another embodiment pertains to an in-flight refueling system. The in-flight refueling system includes a fuel supply, hose drum unit, drogue, and deploying/retrieval device. The hose drum unit is in fluid communication with the fuel supply. The hose drum unit includes a hose. The drogue is disposed upon an end of the hose and is configured to provide flight stability to the hose in response to being introduced to an air stream. The drogue has a storage conformation and a deployed conformation. The deploying/retrieval device includes an arm, ring, and actuator. The arm has a proximate end and a distal end. The ring is secured to the distal end and is configured to releasably secure the drogue. The actuator is secured to the proximate end and is configured to extend the drogue through an air boundary layer during deployment.

Yet another embodiment relates to a method of in-flight refueling. In this method, a fueling hose is deployed from a refueling aircraft. The fueling hose is outfitted with a drogue. In the deploying step, the drogue is extended through a boundary layer of air with a deploying/retrieval device. The deploying/retrieval device includes an arm, ring, and actuator. The arm has a proximate end and a distal end. The ring is secured to the distal end and is configured to releasably secure the drogue. The actuator is secured to the proximate end and is configured to extend and retract the arm. The fueling hose is extended and passes through the ring. The arm is retracted in response to the drogue being clear of the refueling aircraft.

There has thus been outlined, rather broadly, certain embodiments of the disclosure in order that the detailed description thereof herein may be better understood, and in order that the present contribution to the art may be better appreciated. There are, of course, additional embodiments that will be described below and which will form the subject matter of the claims appended hereto.

In this respect, before explaining at least one embodiment in detail, it is to be understood that the disclosure is not limited in its application to the details of construction and to the arrangements of the components set forth in the following description or illustrated in the drawings. The disclosed device and method is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the various embodiments. It is important, therefore, that the claims be regarded as including such equivalent constructions insofar as they do not depart from the spirit and scope of the various embodiments.

BRIEF DESCRIPTION OF THE DRAWINGS

FIG. 4 is a detailed view of a deployment/retrieval device in a retracted configuration in accordance with another embodiment.

FIG. 5 is a detailed view of a deployment/retrieval device in an extended configuration according to FIG. 4.

FIG. 6 is a simplified view of the refueling system in an initial stage of deployment.

FIG. 7 is a simplified view of the refueling system in an intermediate stage of deployment.

FIG. 10 is a simplified view of the refueling system in an intermediate stage of retrieval.

FIG. 11 is a simplified view of the refueling system in an end stage of retrieval.

DETAILED DESCRIPTION

The present disclosure provides a device, system, and method for reducing the effects of wind shear between a drogue and a refueling aircraft. In general, the various embodiments reduce the effects of wind shear between the drogue and the refueling aircraft by securing the drogue until the drogue has been extended past a boundary layer of air in close proximity to the skin of the aircraft. For the purpose of this disclosure, the phrase, "boundary layer of air" refers to a layer of air flowing around the aircraft that has been retarded due to interactions with the aircraft.

Figure 1:
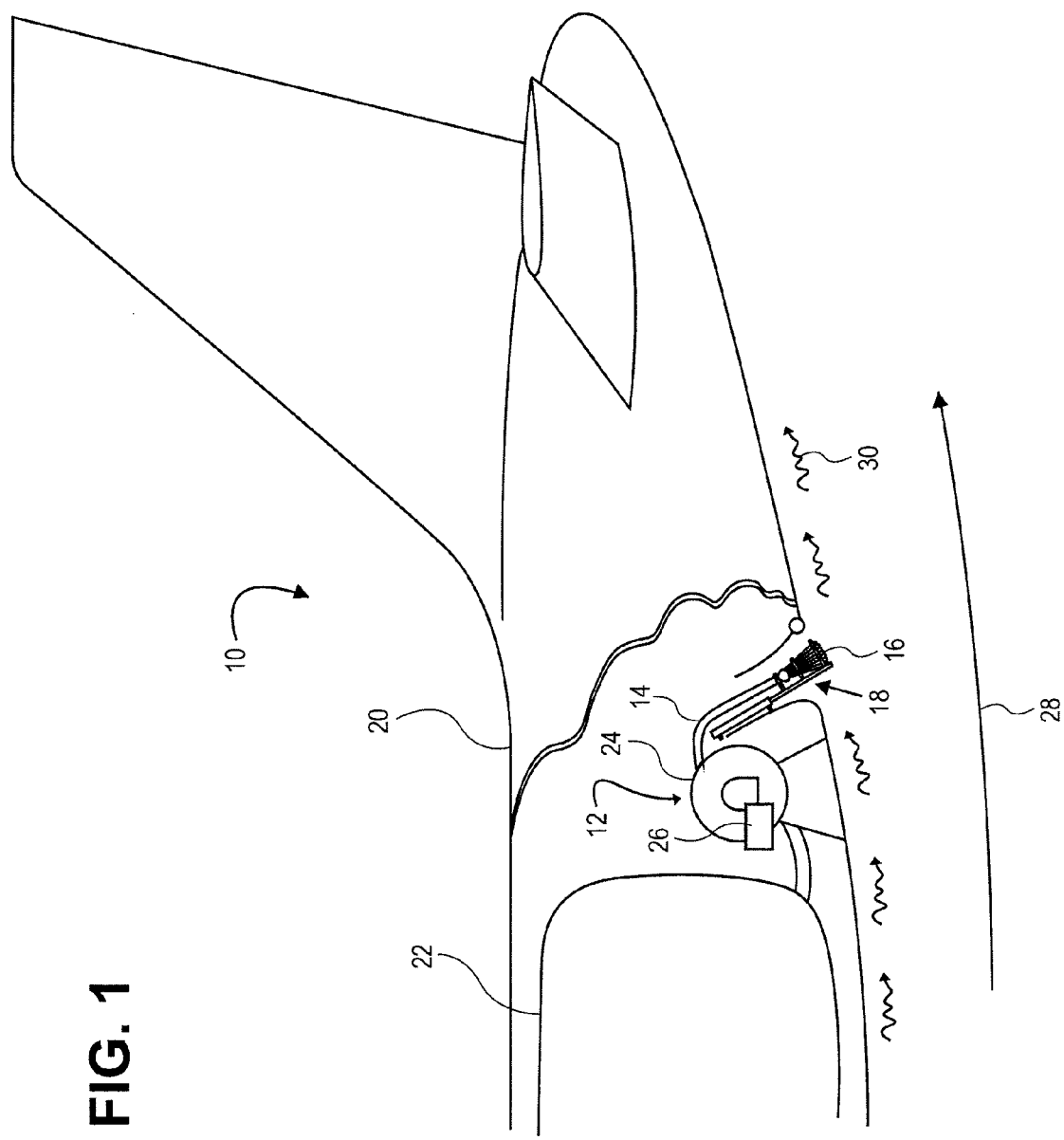
FIG. 1 is a simplified cross sectional view of a refueling system in accordance with an embodiment.

The invention will now be described with reference to the drawing figures, in which like reference numerals refer to like parts throughout. FIG. 1 is a simplified cross sectional view of an in-flight refueling system 10 in accordance with an embodiment. As shown in FIG. 1, the in-flight refueling system 10 includes a hose drum unit 12, hose 14, drogue 16, and deployment/retrieval device 18. Also shown in FIG. 1, the in-flight refueling system 10 is installed in a refueling aircraft 20 and is in fluid communication with a fuel source 22.

The hose drum unit 12 includes a drum 24 to dispense and retract a supply of the hose 14. In addition, the hose drum unit 12 includes a drive/controller unit 26. The drive/controller unit 26 is configured rotate the drum 24 and/or provide sufficient torque to the drum 24 to slow or stop the rotation of the drum 24. For example, during deployment the drogue may be urged by the air stream moving relative to the refueling aircraft 20 to draw the hose 14 out of the refueling aircraft by rotating the drum 24. The drive/controller unit 26 may provide sufficient torque to the drum 24 to control the rate at which the hose 14 is drawn out. Once the hose 14 has extended sufficiently from the refueling aircraft 20, the drive/controller unit 26 may provide sufficient torque to the drum 24 to balance the load supplied by the drogue 16.

FIG. 1 further shows an air stream 28 moving relative to the aircraft 20. This air stream moves relatively faster than a boundary layer of air 30 that is in close proximity to the refueling aircraft 20. As the drogue 16 is deployed from the refueling aircraft 20, the differences in the relative airspeed subject the drogue 16 to wind shear and can act to drive the drogue 16 towards the aircraft 20.

Figure 2:
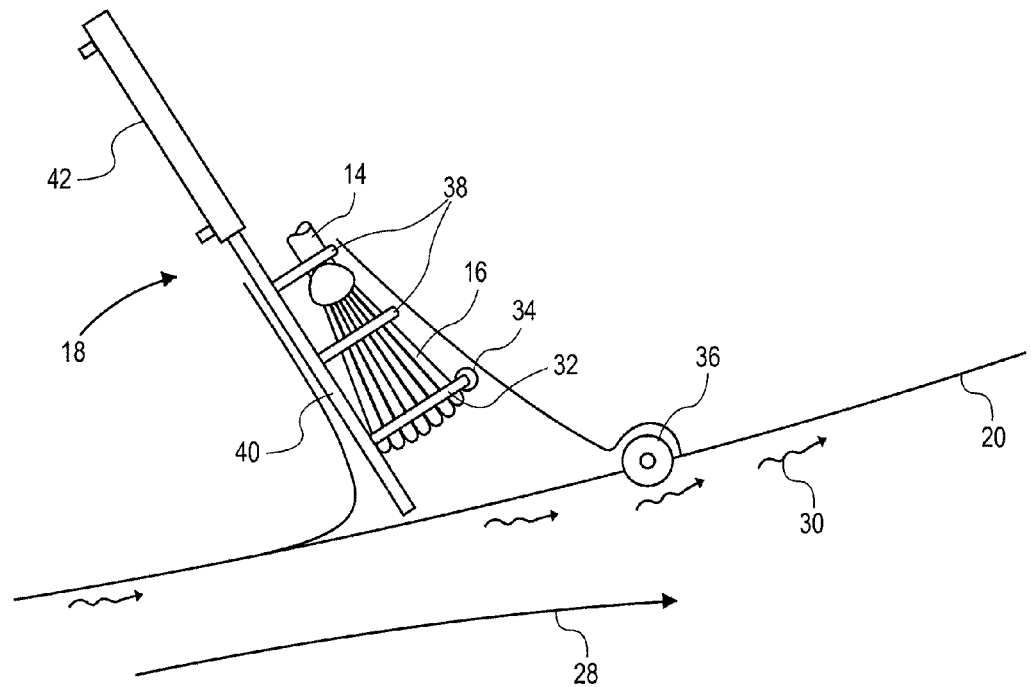
FIG. 2 is a detailed view of a deployment/retrieval device in accordance with an embodiment.

FIG. 2 is a detailed view of the deployment/retrieval device 18 in accordance with an embodiment. In general, FIG. 2 shows a drogue tunnel and the components therein. Typically, the environment of the drogue tunnel is closed to the aircraft interior. However, to simplify the figures, the environmental containment system is not shown or described herein. As shown in FIG. 2, the deployment/retrieval device 18 includes a ring 32. This ring 32 releasably secures drogue 16 therein. During operation, the hose 14 passes over the ring 32. To reduce frictional or rolling resistance of the hose 14, the ring 32 includes a roller 34. This roller 34 is similar to a roller 36 that may reduce friction and/or wear on the hose 14 and refueling aircraft 20.

In addition to the ring 32, the deployment/retrieval device 18 may optionally include one or more additional rings 38. If included, these rings 38 may provide additional security during deployment/retrieval operations and may assist in guiding the hose 14 and drogue 16 into alignment. The ring 32 and, if present, rings 38 may be mounted to an arm 40. The arm 40 is configured to be extended out from the refueling aircraft 20 to a sufficient extent that the drogue 16 passes through the boundary layer of air 30. In addition, the arm 40 is configured to provide sufficient strength and rigidity so as to reduce or eliminate excessive movement of the drogue 16 as it is driven through the boundary layer of air 30. In so doing, the deployment/retrieval device 18 reduces or eliminates the effects of wind shear and/or turbulence to the drogue 16 and/or underside of the refueling aircraft 20.

The arm 40 may be driven by an actuator 42. The actuator 42 includes any suitable actuating device such as, for example, a pneumatic or hydraulic piston, linear actuator, electronic or mechanical actuator, or the like.

Figure 3:
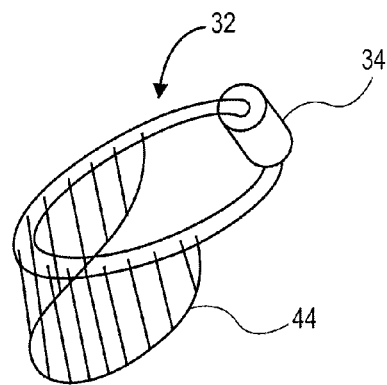
FIG. 3 is a detailed view of a deployment/retrieval device in accordance with another embodiment.

FIG. 3 is a detailed view of the ring 32 in accordance with another embodiment. As shown in FIG. 3, the ring 32 includes a wire pitch 44. The wire pitch 44 may be optionally included to facilitate collecting and/or collapsing the drogue 16 during retrieval. If included, the wire pitch 44 may encompass about one half the circumference of the ring 32 and may be about one half the length of the drogue 16 in height. To decrease drag, the wire pitch 44 may include relatively fine wires.

FIG. 4 is a detailed view of the deployment/retrieval device 18 in a retracted configuration in accordance with another embodiment. As shown in FIG. 4, the deployment/retrieval device 18 may include a plurality of segments 46a to 46n. For example, the deployment/retrieval device 18 may include three segments 46a to 46c configured to telescope. In the refracted configuration shown in FIG. 4, the deployment/retrieval device 18 may be relatively compact.

FIG. 5 is a detailed view of the deployment/retrieval device 18 in an extended configuration according to FIG. 4. As show in FIG. 5, the deployment/retrieval device 18 may be telescopically extended. For example, fluid may be introduced to the deployment/retrieval device 18 to urge the segments 46a and 46b to extend from 46c. Similarly, the segments 46a and 46b may be retracted by withdrawing fluid therefrom.

Also shown in FIG. 5, the arm 40 may include a backstop 48 to assist in recovery of the drogue 16. The backstop 48 extends past the ring 32. As the deployed drogue 16 is drawn into the ring 32 via the action of the hose drum unit 12, the backstop 48 assists in directing the drogue 16 into the ring 32 and collapsing the drogue 16 from a deployed or expanded state into a stowed state.

FIG. 6 is a simplified view of the refueling system 10 in an initial stage of deployment. As shown in FIG. 6, the arm 40 is extended out of the refueling aircraft 20. In so doing, the ring 32 disposed at or near the end of the arm 40 is extended past the boundary layer of air 30 and into the air stream 28. The drogue 16 is secured or captured by the ring 32 and so is carried through the boundary layer of air 30 and into the air stream 28 as well. In order to remain captured by the ring 32, the drive/controller unit 26 may provide sufficient torque or resistance to overcome the boundary layer of air 30 and/or air stream 28 acting on the drogue 16 to pull the drogue 16 free of the ring 32.

Once the drogue 16 is within the air stream 28, the torque supplied by the drive/controller unit 26 may be reduced to allow the drogue 16 to be pulled free of the ring 32 and deployed.

FIG. 7 is a simplified view of the refueling system in an intermediate stage of deployment. As shown in FIG. 7, as a result of being introduced to the air stream 28 and pulled free of the ring 32, the drogue 16 inflates or otherwise expands to stabilize the flight of the hose 14. As the hose 14 is unwound from the drum 24, it threads through the ring 32 and rolls against the roller 34. The roller 34 reduces friction and wear between the hose 14 and the ring 32.

Once the drogue 16 has extended past the rear of the refueling aircraft 20 or to a predetermined extent, the arm 40 may be refracted. Retracting the arm 40 reduces drag on the forward movement of the refueling aircraft 20. It is an advantage of the embodiment described herein that, while refracted, the arm 40 and ring 32 do not impart any drag on the refueling aircraft 20. It is another advantage that, due to the minimal frontal area of the arm 40 and ring 32, the drag imparted on the refueling aircraft 20 is negligible during deployment and retrieval operations. It is a further advantage of the deployment/retrieval device 18 that refueling operations can take place in the event of a failure of the deployment/retrieval device 18. That is, if the deployment/retrieval device 18 fails to extend the arm 40, the drogue 16 can be deployed in a conventional manner. However, due to the uncomplicated design and robust nature of the components of the deployment/retrieval device 18, it is unlikely to suffer failure.

Figure 8:
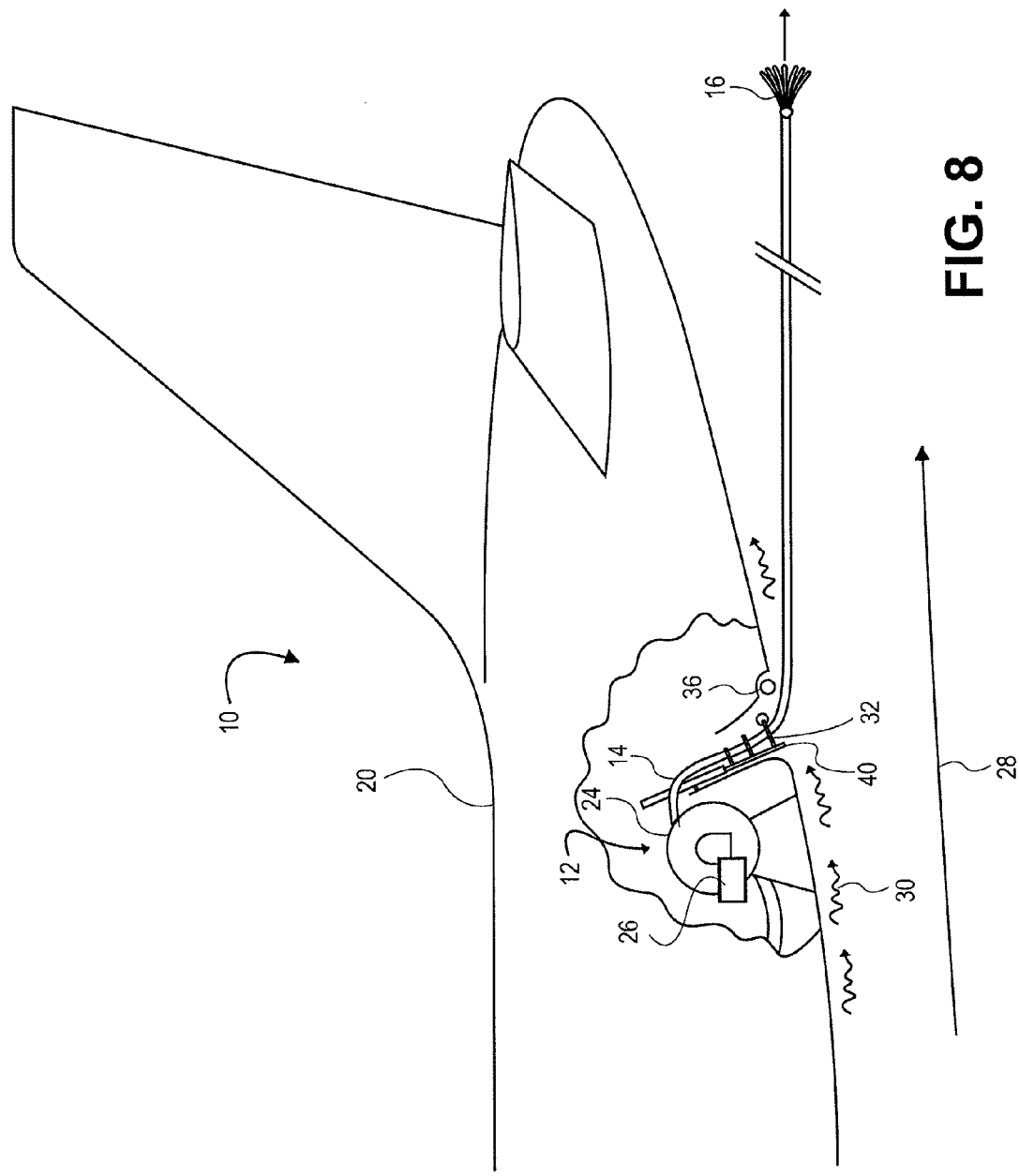
FIG. 8 is a simplified view of the refueling system in an end stage of deployment.

FIG. 8 is a simplified view of the refueling system in an end stage of deployment. As shown in FIG. 8, the arm 40 may be retracted into the refueling aircraft 20 and the drag reduced accordingly. In the retracted conformation, the hose 14 may roll upon the roller 36. Refueling operations may proceed in a conventional manner. That is, receiving aircraft may approach and attach to the hose 14 via a nozzle or coupling (not shown). Fuel may be delivered to the receiving aircraft and the receiving aircraft may depart. Following refueling operations, the hose 14 and drogue 16 may be refracted. In various embodiments, the hose 14 and drogue 16 may be partially retracted first and then the arm 40 may be extended to recover the drogue 16 or the arm 40 may be extended prior to or during retraction of the hose 14 and drogue 16 and retraction may proceed until the drogue is captured. Regardless of the order in which the steps are performed, in a preferred embodiment, the arm 40 is extended prior to the drogue 16 striking the refueling aircraft 20. For example, as shown in FIG. 9, the arm 40 may be extended prior to the drogue 16 reaching the aft-most part of the refueling aircraft 20.

Figure 9:
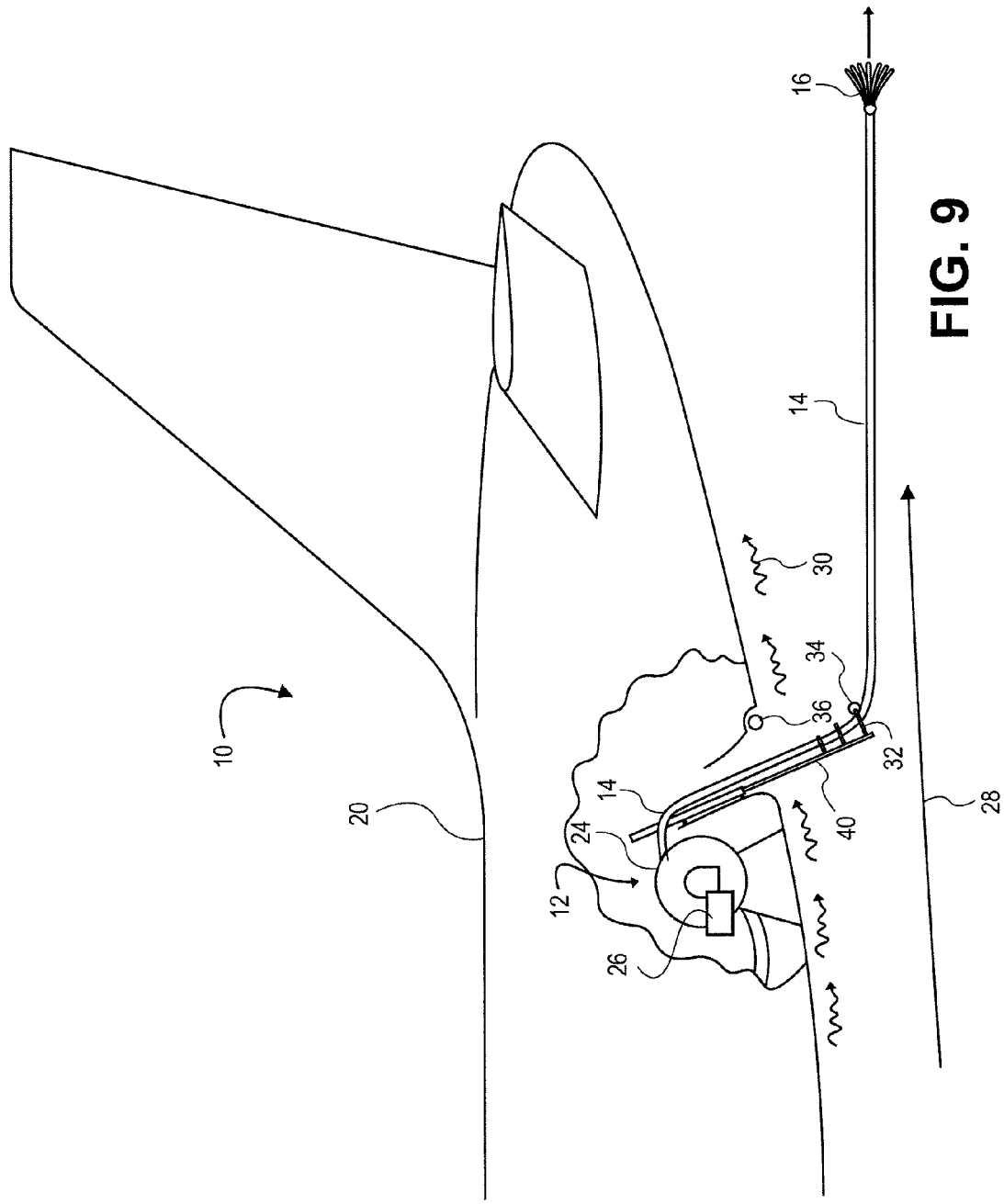
FIG. 9 is a simplified view of the refueling system in an initial stage of retrieval.

FIG. 9 is a simplified view of the refueling system 10 in an initial stage of retrieval. As shown in FIG. 9, by extending the arm 40, the hose 14 and drogue 16 may be maintained in the air stream 28 during retrieval. In this manner, the hose 14 and drogue 16 may be retrieved without striking the refueling aircraft 20. Also shown in FIG. 9, as the hose 14 is drawn inward by the hose drum unit 12, the hose 14 may roll on the roller 34 to reduce wear of the hose 14 and reduce the torque required by the drive/controller unit 26.

FIG. 10 is a simplified view of the refueling system 10 in an intermediate stage of retrieval. As shown in FIG. 10, the backstop 48 is disposed to direct the drogue 16 up and into the ring 32. The backstop 48 additionally assists in deflating or collapsing the drogue 16 from the deployed configuration into a storage configuration. Once secured within the ring 32 and/or rings 38, the drogue 16 may be drawn into the refueling aircraft 20 via the action of the hose drum unit 12 and/or actuator 42.

FIG. 11 is a simplified view of the in-flight refueling system 10 in an end stage of retrieval. As shown in FIG. 11, the drogue 16 and deployment/retrieval device 18 may be completely withdrawn into the refueling aircraft 10. It is an advantage of the deployment/retrieval device 18 that drag on the refueling aircraft 20 is minimized by withdrawing the deployment/retrieval device 18 into the refueling aircraft 20. In contrast, a device that resides on the exterior of the refueling aircraft 20 will generate drag and therefore impede the performance of the refueling aircraft. In addition, aerodynamic surfaces added to the exterior of a device that resides on the exterior of the refueling aircraft add weight, complexity, and expense.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of in-flight refueling, comprising the steps of:
   deploying a fueling hose from a refueling aircraft, the fueling hose having a drogue, the deploying step including:
   extending the drogue using a telescoping arm having a ring; and
   passing the fueling hose through the ring to deploy the fueling hose; and
   retrieving the fueling hose, the retrieving step including:
   drawing the drogue into a wire pitch mounted on the ring; and
   collapsing the drogue in response to drawing the drogue into the wire pitch.

2. The method of claim 1, wherein the deploying step further includes:
   drawing the drogue into the refueling aircraft after deploying the fueling hose.

3. The method of claim 1, wherein the deploying step further includes:
   retracting the arm in response to the drogue being clear of the refueling aircraft.

4. The method of claim 1, further comprising the step of:
   extending the arm and the drogue in a direction along an axis of the arm through an air boundary layer.

5. The method of claim 1, further comprising the step of:
   securing the drogue within the ring as the drogue passes through an air boundary layer.

6. The method of claim 1, wherein the retrieving step further includes:
   collapsing the drogue from an expanded state into a stowed state using a backstop mounted on the arm.

7. The method of claim 1, further comprising the step of:
   rolling the hose over a roller disposed upon a trailing edge of the ring.

8. The method of claim 1, further comprising the step of:
   extending and retracting the arm using telescoping segments of the arm.

9. The method of claim 1, wherein the retrieving step further includes:
   drawing the fueling hose toward the ring; and
   retracting the ring using the telescoping arm.

10. The method of claim 9, wherein the retrieving step further includes:
   drawing the drogue into the refueling aircraft.

11. The method of claim 1, wherein the hose is mounted on a drum, the method further comprising the step of:
   controlling rotation of the drum in a manner causing deployment and retrieval of the drogue.

12. The method of claim 11, further comprising the step of:
   controlling a rate at which the hose is drawn out of the refueling aircraft by an air boundary layer acting on the drogue or an air stream acting on the drogue.

13. The method of claim 12, further comprising the step of:
   providing, using a drive/controller unit, torque to the drum in an amount to balance a load acting on the drogue by the air boundary layer or the air stream.

14. A method of in-flight refueling, comprising the steps of:
   deploying a fueling hose from a refueling aircraft, the fueling hose having a drogue, the deploying step including:
      securing the drogue within a ring of a telescoping arm;
      extending the arm and the drogue through an air boundary layer; and
      passing the fueling hose through the ring to deploy the fueling hose; and
   retrieving the fueling hose, the retrieving step including:
      drawing the drogue into a wire pitch mounted on the ring; and
      collapsing the drogue in response to drawing the drogue into the wire pitch.

15. The method of claim 14, wherein the retrieving step further includes:
   collapsing the drogue from an expanded state into a stowed state using a backstop mounted on the arm.

16. The method of claim 14, further comprising the step of:
   extending the arm and the drogue in a direction along an axis of the arm.

17. The method of claim 14, further comprising the step of:
   securing the drogue within the ring as the drogue is drawn through an air boundary layer.

18. The method of claim 14, further comprising the step of:
   rolling the hose over a roller disposed upon a trailing edge of the ring.

19. The method of claim 14, wherein the retrieving step further includes:
   drawing the fueling hose toward the ring; and
   retracting the ring using the telescoping arm.

20. The method of claim 19, wherein the retrieving step further includes:
   drawing the drogue into the refueling aircraft.

* * * * *